United States Patent [19]
Kheraluwala et al.

[11] Patent Number: 5,481,449
[45] Date of Patent: Jan. 2, 1996

[54] EFFICIENT, HIGH POWER DENSITY, HIGH POWER FACTOR CONVERTER FOR VERY LOW DC VOLTAGE APPLICATIONS

[75] Inventors: Mustansir H. Kheraluwala, Schenectady; Robert L. Steigerwald, Burnt Hills, both of N.Y.

[73] Assignee: General Electric Company, Schnectady, N.Y.

[21] Appl. No.: 367,906

[22] Filed: Jan. 3, 1995

Related U.S. Application Data

[63] Continuation of Ser. No. 215,149, Mar. 21, 1994, abandoned.

[51] Int. Cl.⁶ .................................................. H02M 3/335
[52] U.S. Cl. .............................................. 363/17; 323/259
[58] Field of Search ............................... 363/17, 37, 68, 363/132, 101, 65, 71; 323/259, 344, 222, 217, 219

[56] References Cited

U.S. PATENT DOCUMENTS

| | | | |
|---|---|---|---|
| 5,027,264 | 6/1991 | DeDoncker et al. | 363/17 X |
| 5,113,337 | 5/1992 | Steigerwald | 363/17 X |
| 5,119,283 | 6/1992 | Steigerwald et al. | 363/37 |
| 5,283,727 | 2/1994 | Kheraluwala et al. | 363/37 X |

*Primary Examiner*—Peter S. Wong
*Assistant Examiner*—E. To
*Attorney, Agent, or Firm*—Jill M. Breedlove; Marvin Snyder

[57] ABSTRACT

A high efficiency, high power factor, low voltage power converter includes a dual active bridge converter (DABC) having transformer-coupled primary-side and secondary-side bridge connections of switching devices and providing two output voltages. One output voltage drives a resonant boost converter coupled in series between an ac rectifier for rectifying an ac line voltage and the DABC. The boost converter, which is controlled by frequency modulation, boosts a dc bus voltage above the peak line voltage, thereby providing a high power factor. The other output is a low dc voltage which is regulated by controlling the phase shift between the voltages respectively produced by the primary-side and secondary-side connections of switching devices of the DABC. Advantageously, the leakage inductance of the DABC transformer coupling the primary and secondary sides of the DABC is efficiently used for energy transfer therebetween such that an output filter inductor is not needed. Moreover, use of synchronous rectifiers in the DABC allows for active control on the secondary side of the DABC transformer, further increasing efficiency. Zero-voltage switching of the switching devices of the DABC allows for an increase in operating frequency and hence an increase in power density.

4 Claims, 3 Drawing Sheets

EFFICIENT, HIGH POWER DENSITY, HIGH POWER FACTOR CONVERTER FOR VERY LOW DC VOLTAGE APPLICATIONS

This application is a continuation of application Ser. No. 08/215,149 filed Mar. 21, 1994, now abandoned.

FIELD OF THE INVENTION

The present invention relates generally to power converters and, more particularly, to a high efficiency, low voltage ac-to-dc switching converter operating with a high input power factor.

BACKGROUND OF THE INVENTION

Compliance with impending regulations on high-frequency distortions of main ac power lines and electromagnetic emissions, is necessitating improvement in the quality of power drawn by ac-to-dc converters used in standard home and office equipment, such as personal computers, televisions, home appliances and the like. Moreover, there is an increasing demand for lightweight, very efficient, low voltage (e.g., <5Vdc) power supplies for next-generation laptop/notebook personal computers. Such demanding requirements cannot all be met simultaneously by presently available power conversion methods.

Accordingly, it is desirable to provide a highly efficient ac-to-dc power converter having a high power density which provides a low voltage dc output and operates with a very high power factor.

SUMMARY OF THE INVENTION

A high efficiency, high power factor, low voltage power converter comprises a dual active bridge converter (DABC) having transformer-coupled primary-side and secondary-side bridge connections of switching devices and providing two output voltages. One output voltage drives a resonant boost converter coupled in series between an ac rectifier for rectifying an ac line voltage and the DABC. The boost converter, which is controlled by frequency modulation, boosts a dc bus voltage above the peak line voltage, thereby providing a high power factor. The other output as a low dc voltage which is regulated by controlling the phase shift between the voltages respectively produced by the primary-side and secondary-side connections of switching devices of the DABC. Advantageously, the leakage inductance of the DABC transformer coupling the primary and secondary sides of the DABC is efficiently used for energy transfer therebetween such that an output filter inductor is not needed. Moreover, use of synchronous rectifiers as the active devices on the secondary side of the DABC allows for improved rectification efficiency. In addition, the DABC allows for active control on the secondary side of the DABC transformer. Zero-voltage switching of the active devices of the DABC allows for an increase in operating frequency and hence an increase in power density.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
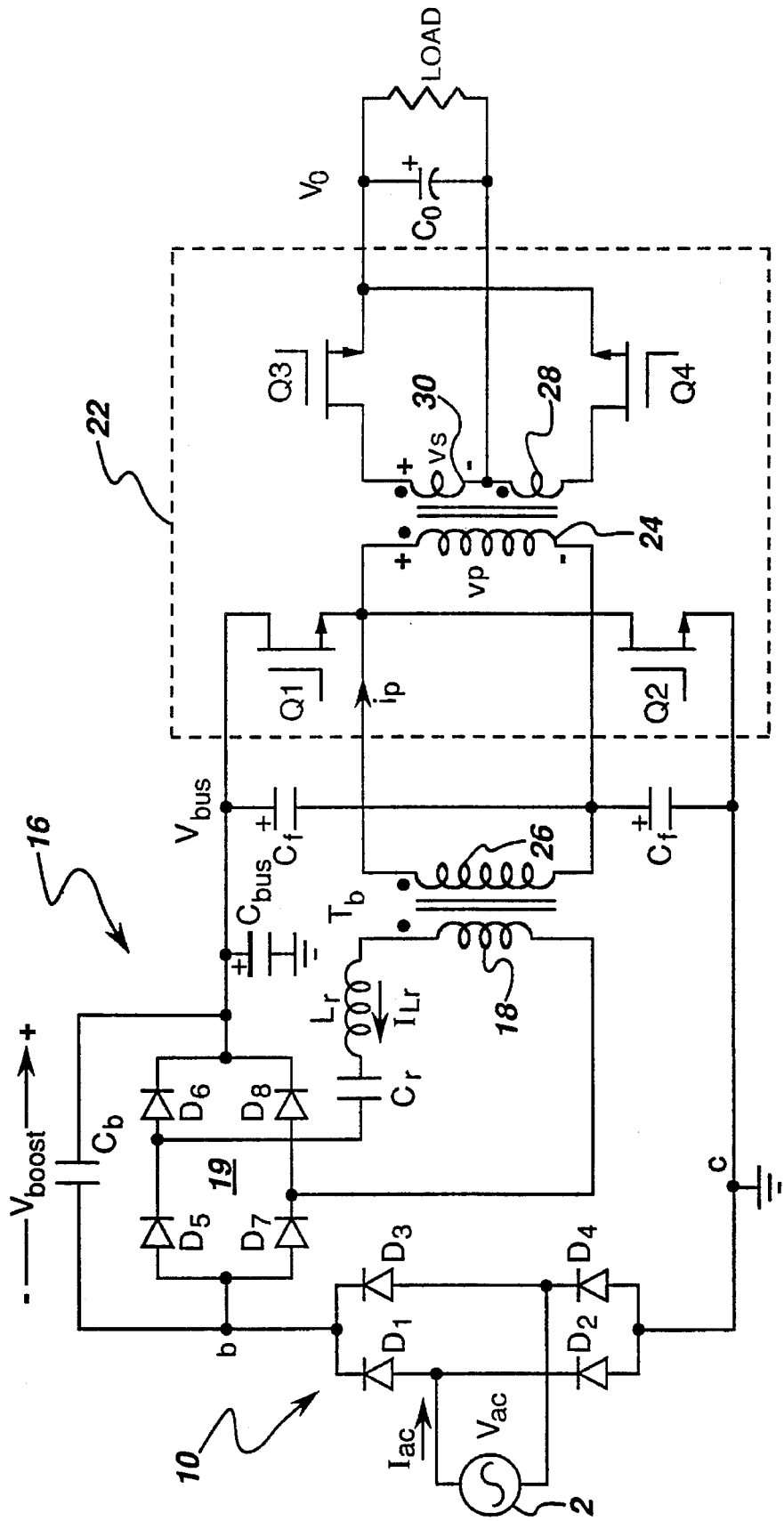
FIG. 1 schematically illustrates an off-line switching power supply in accordance with the present invention.

FIG. 1 illustrates a preferred embodiment of an off-line switching power supply according to the present invention for converting an ac power line voltage to a regulated dc output voltage. As shown, the power supply of FIG. 1 includes a full-wave rectifier 10, having diodes $D_1$–$D_4$ connected together in a full-bridge configuration, coupled to an ac power source 2. Rectifier 10 provides a full-wave rectified voltage between points b and c. A boost converter output circuit 16 is coupled in series between full-bridge rectifier 10 and a dc bus voltage $V_{bus}$. A dc bus capacitor $C_{bus}$ is coupled across the voltage $V_{bus}$. The boost converter output circuit 16 is shown as including full-wave rectifier 19 comprising diodes $D_5$–$D_8$ with a series resonant circuit coupled between the junctions joining diodes $D_5$–$D_6$ and $D_7$–$D_8$. The series resonant circuit includes a secondary winding 18 of a boost transformer $T_b$ coupled in series with a resonant capacitor $C_r$ and a resonant inductor $L_r$. A boost capacitor $C_b$ is coupled in parallel with the boost circuit for high frequency filtering.

The bus voltage $V_{bus}$ supplies the input voltage to a dual active bridge converter (DABC) 22 comprising a primary-side half-bridge connection of switching devices $Q_1$–$Q_2$ connected between the dc link and ground which is coupled via an output transformer To to a secondary-side connection of switching devices $Q_3$ and $Q_4$.

Operation of a DABC is described in U.S. Pat. No. 5,027,264 of R. W. De Doncker et al., issued on Jun. 25, 1991 and incorporated by reference herein. High power factor operation of a resonant boost converter is described in commonly assigned U.S. Pat. No. 5,113,337 of R. L. Steigerwald, issued May 12, 1992, and commonly assigned U.S. Pat. No. 5,283,727 of M. H. Kheraluwala and R. L. Steingerwals, issued Feb. 1, 1994, which are also incorporated by reference herein.

In FIG. 1, by way of example only, primary-side switching devices $Q_1$–$Q_2$ and secondary-side switching devices $Q_3$–$Q_4$ are each illustrated as being connected in a half-bridge configuration; however, full-bridge connections may also be used for higher power applications, e.g. >1 kW. One terminal of primary winding 24 of output transformer To is coupled to the junction between primary-side switching devices $Q_1$ and $Q_2$; and the other terminal of primary winding 24 is coupled to a junction between a pair of high frequency filter capacitors $C_f$ connected in series between the output bus $V_{bus}$ and ground.

The secondary winding 28 of output transformer To is connected between the drains of switching devices $Q_3$ and $Q_4$. The sources of switching devices $Q_3$ and $Q_4$ are connected together at the output voltage terminal $V_o$ of the DABC. Output transformer To is shown as having a center-tapped secondary winding with the load taken between voltage $V_o$ and the center tap terminal 30, with an output filter capacitor $C_o$ connected thereacross.

In operation, the primary leg $Q_1$–$Q_2$ of the DABC drives the series resonant circuit (Lr, Cr, Tb) of boosting circuit 16 such that the rectified output voltage across boost capacitor $C_b$ is added in series with the rectified line voltage to boost the bus voltage $V_{bus}$ above the peak line voltage and thus provide power factor correction. The output voltage of the resonant boost converter $V_{boost}$ is controlled by frequency modulation. (Such frequency modulation is described herein as active control, but passive control is also possible, as described in U.S. Pat. No. 5,113,337 of R. L. Steigerwald, cited hereinabove.) The low dc output voltage $V_o$ (e.g., $V_o$<5V, for example, 3.3V or 1.5V) is regulated by controlling the phase shift $\Theta$ between the primary leg $Q_1$ and $Q_2$ and the secondary leg $Q_3$ and $Q_4$ of the DABC. The two output voltages $V_{boost}$ and $V_o$ are thus controlled substantially independently of each other.

Preferably, devices $Q_3$ and $Q_4$ comprise synchronous rectifiers because the very low drain-to-source on-resistance of synchronous rectifiers results in a high rectification efficiency. (A synchronous rectifier is a very low on-resistance power FET.)

Advantageously, the leakage inductance of the output transformer $T_o$ is used as an energy transfer element, such that an output filter inductor is not required. Additional advantages of the converter configuration of the present invention include: high power density, high efficiency, and low stress levels on the semiconductor devices.

Figure 2:
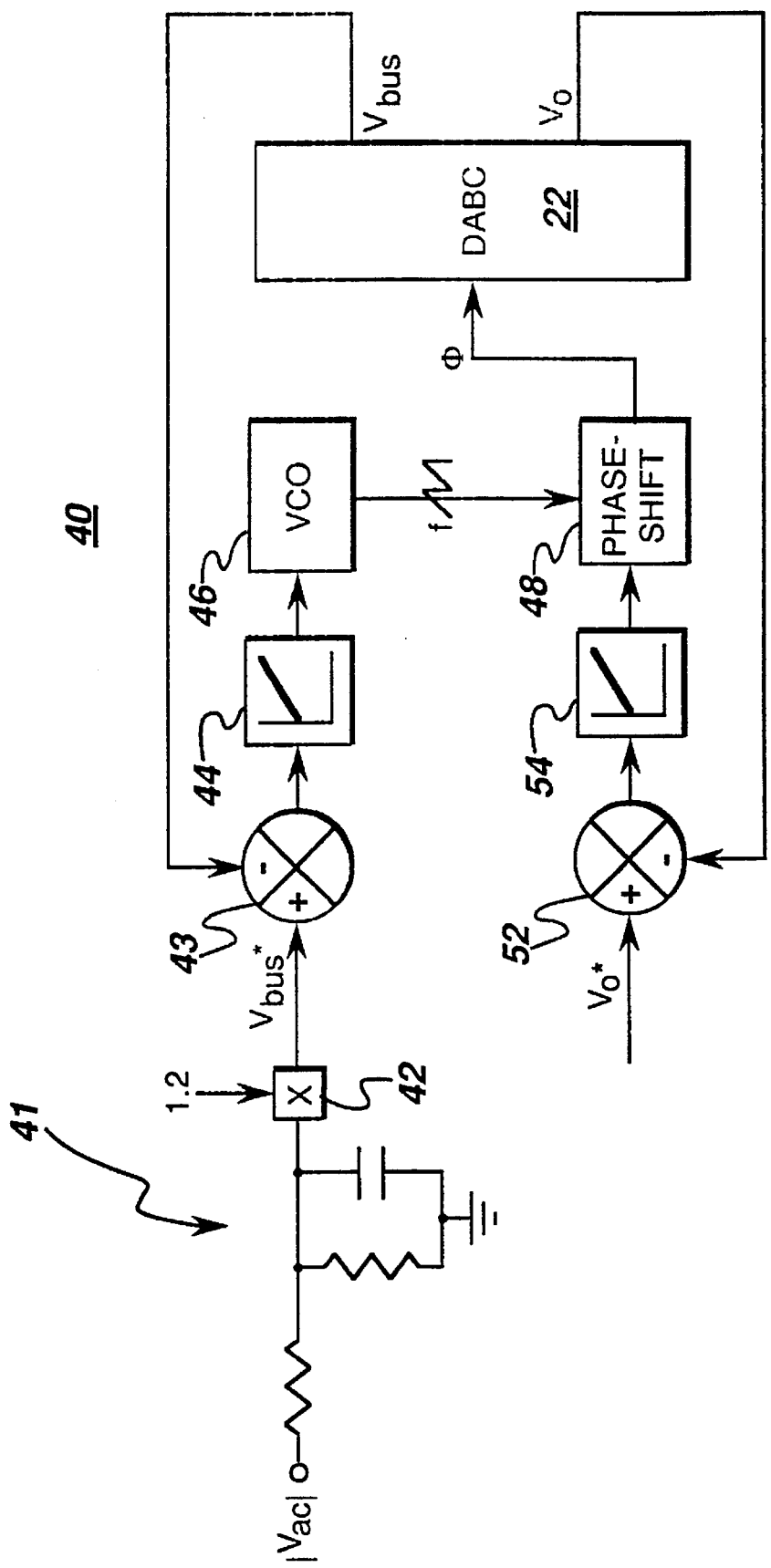
FIG. 2 is a block diagram illustrating a suitable control for an off-line switching power supply of FIG. 1.
Figure 3:
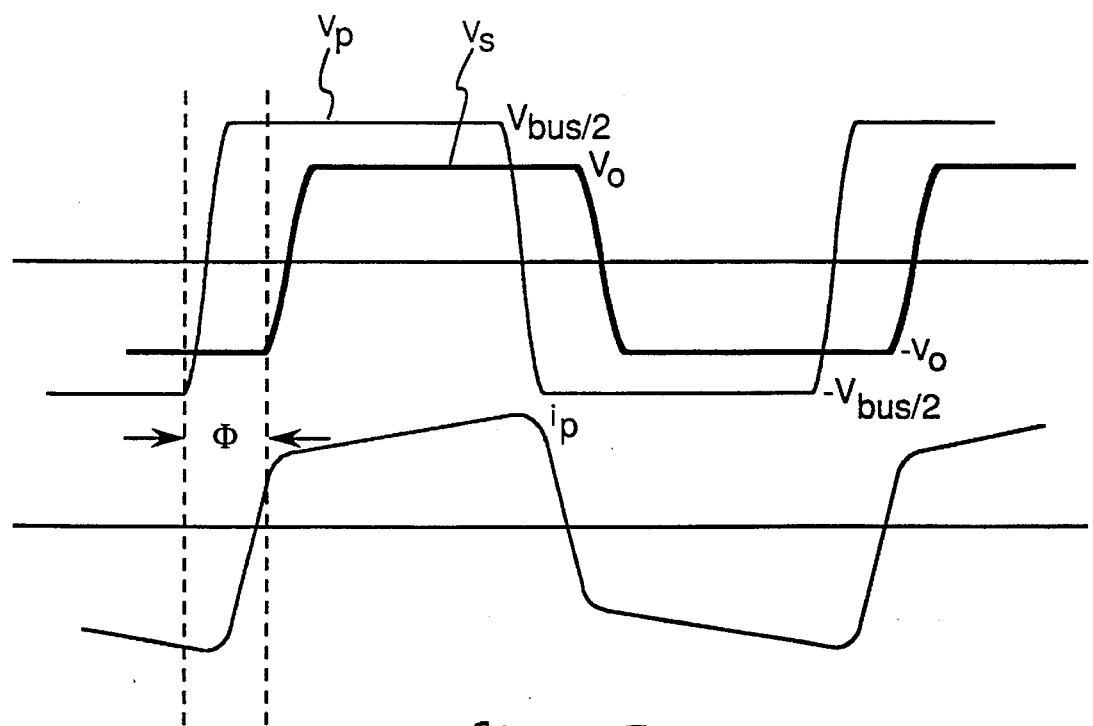
FIG. 3 graphically illustrates primary-side and secondary-side voltage waveforms for the DABC as well as the corresponding input current waveform thereto.
Figure 4:
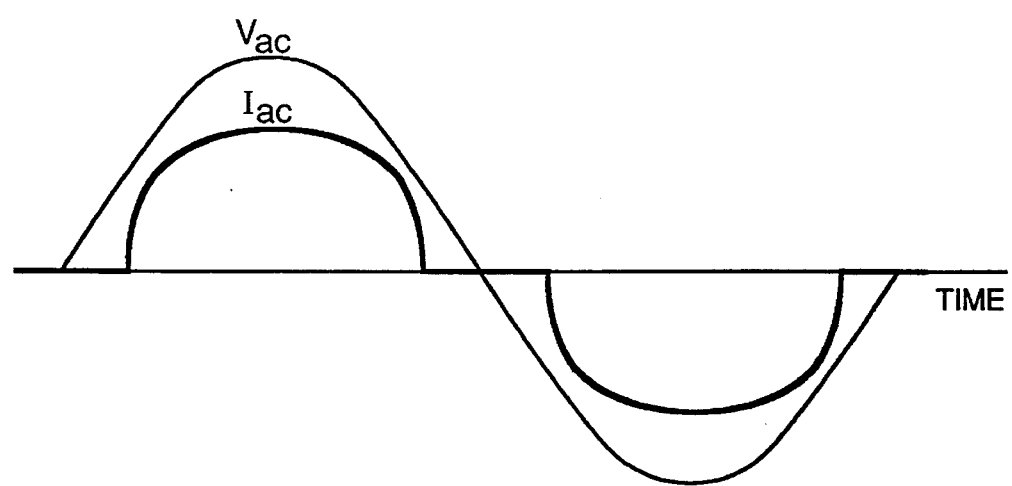
FIG. 4 graphically illustrates 60 Hz ac input line voltage and current to the power converter of FIG. 1.

FIG. 2 illustrates a suitable control 40 for controlling the boost output voltage $V_{boost}$ and the power supply output voltage $V_o$ in accordance with the present invention. Control 40 receives a signal $|V_{ac}|$ proportional to the peak amplitude of the ac input line voltage $V_{ac}$. Voltage $|V_{ac}|$ is provided, via a low-pass filter 41 because only peak line voltage is needed, to a multiplier 42 for multiplication thereof by a value of (1+k), where 0<k<1, to provide a commanded dc bus voltage $V_{bus}$*. As indicated, a preferred value of k=0.2. The commanded dc bus voltage is compared in a summer 43 to the actual dc bus voltage $V_{bus}$, and the difference signal is supplied from summer 43 to a proportional plus integral (PI) controller 44 which is chosen to provide a loop bandwidth below the ac line frequency. Similarly, the second input signal to control 40 is a commanded output voltage signal $V_o$* which is provided to a summer 52 for comparing it to the actual output voltage $V_o$. The resulting error signal is provided to another PI controller 54, the output signal of which is provided to a phase-shift control circuit 48.

The output signal from PI controller 44 is provided to a voltage controlled oscillator (VCO) 46 which converts the PI controller output signal to a switching signal for setting the switching frequency of devices $Q_1$–$Q_4$ at a value sufficient to maintain the dc bus voltage $V_{bus}$ at the commanded value $V_{bus}$*. The output signal from VCO 46 is provided to phase-shift control 48.

Phase-shift control 48 controls the phase shift between primary-side switching devices $Q_1$ and $Q_2$ and secondary side switching devices $Q_3$ and $Q_4$. In particular, phase-shift control 48 controls the phase-shift between square waves voltages vp and vs generated by the primary-side converter leg $Q_1$–$Q_2$ and the secondary converter leg $Q_3$–$Q_4$, respectively. The phase shift is independent of frequency and can easily be generated by comparing the ramp of VCO 46 to the reference level output of PI controller 54. FIG. 5 illustrates the phase-shifted high-frequency switching voltage waveforms $v_p$ and $v_s$ for the primary and secondary sides of the DABC converter. FIG. 5 also illustrates the input current waveform $i_p$ to the DABC converter.

Advantageously, in the power converter and control configuration of the present invention, the primary side switching devices $Q_1$ and $Q_2$ act to drive both the primary side of the DABC and the resonant boost converter. Moreover, the output voltage $V_o$ is controlled by phase shifting the output switching devices $Q_3$ and $Q_4$ relative to the input switching devices $Q_1$ and $Q_2$, such that output voltage control and synchronous rectification are achieved simultaneously and efficiently. Hence, as a further advantageous result, no critical timing is required with respect to switching of synchronous rectifiers $Q_3$ and $Q_4$ as in conventional converters because in the DABC the low voltage secondary side devices are naturally zero-voltage switched, resulting in very low switching losses. Still further, by virtue of this power conversion scheme, all active devices $Q_1$–$Q_4$ are soft-switched.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A high power factor power supply, comprising:

an ac rectifier for providing a rectified ac voltage when coupled to an ac power line;

a power converter comprising a single boost converter and a dual active bridge converter, said boost converter coupled in series between said ac rectifier and a dc bus voltage, said boost converter comprising a resonant circuit including a combination of a boost transformer, a resonant inductance and a resonant capacitance, said dual active bridge converter comprising a primary-side bridge connection of switching devices and a secondary-side bridge connection of switching devices, said primary-side connection of switching devices and said secondary-side connection of switching devices being coupled by an output transformer, said primary-side switching devices driving both the primary side of said dual active bridge converter and said resonant boost converter; and a control system for controlling said primary-side and secondary-side switching devices to provide a frequency modulated output voltage for driving said boost converter, said control system controlling a power supply output voltage by providing a phase shift between square-wave voltages respectively produced by said primary-side and secondary side connections of switching devices, such that control of said power supply output voltage and efficient synchronous rectification are achieved simultaneously without discrete timing control.

2. The power supply of claim 1 wherein said primary-side connection of switching devices and said secondary-side connection of switching devices each comprise a half-bridge connection.

3. The power supply of claim 1 wherein each of said secondary-side switching devices comprises a synchronous rectifier.

4. The power supply of claim 1 wherein said power supply output voltage is less than 5 volts.

* * * * *